(12) United States Patent
Faust, Jr.

(10) Patent No.: US 12,734,602 B2
(45) Date of Patent: Sep. 15, 2026

(54) CONDUCTIVE SHEET APPLICATION PROCESS AND CONDUCTIVE SHEET ASSEMBLY

(71) Applicant: East Penn Manufacturing Co., Lyon Station, PA (US)

(72) Inventor: Thomas Faust, Jr., Wyomissing, PA (US)

(73) Assignee: East Penn Manufacturing Co., Lyon Station, PA (US)

( * ) Notice: Subject to any disclaimer, the term of this patent is extended or adjusted under 35 U.S.C. 154(b) by 264 days.

(21) Appl. No.: 18/331,504

(22) Filed: Jun. 8, 2023

(65) Prior Publication Data

US 2024/0408692 A1 Dec. 12, 2024

(51) Int. Cl.

| | |
|---|---|
| ***B23K 20/02*** | (2006.01) |
| ***H01B 5/00*** | (2006.01) |
| ***H01B 5/14*** | (2006.01) |
| ***H01M 4/14*** | (2006.01) |
| ***H01M 10/18*** | (2006.01) |

(52) U.S. Cl.

CPC ............... *B23K 20/02* (2013.01); *H01B 5/00* (2013.01); *H01B 5/14* (2013.01); *H01M 4/14* (2013.01); *H01M 10/18* (2013.01)

(58) Field of Classification Search

None

See application file for complete search history.

(56) References Cited

U.S. PATENT DOCUMENTS 373,703 A 11/1887 Wagg
6,736,942 B2 * 5/2004 Weihs .................. C04B 37/006 204/192.12
8,357,469 B2 1/2013 Shaffer, II et al.
8,597,817 B2 * 12/2013 Faust ............... H01M 10/0418 429/142
10,510,908 B2 12/2019 Lee et al.

FOREIGN PATENT DOCUMENTS

DE 1926762 11/1970

* cited by examiner

*Primary Examiner* — Daniel J. Schleis
(74) *Attorney, Agent, or Firm* — Barley Snyder

(57) ABSTRACT

A process of applying a conductive material to a substrate includes positioning a plurality of first conductive sheets between the substrate and a second conductive sheet. The first conductive sheets are heated to melt the first conductive sheets. The first conductive sheets have a lower melting point than the substrate and the second conductive sheet; the substrate and the second conductive sheet remain in a solid state when the first conductive sheets melt. A force is applied on the second conductive sheet toward the substrate, and the first conductive sheets are cooled to an attached state in which the first conductive sheets mechanically connect the second conductive sheet with the substrate.

12 Claims, 3 Drawing Sheets

CONDUCTIVE SHEET APPLICATION PROCESS AND CONDUCTIVE SHEET ASSEMBLY

FIELD OF THE INVENTION

The present invention relates to a process of applying a conductive sheet to a substrate and to an assembly resulting from the process.

BACKGROUND

Attaching a conductive material to a substrate is desired in many different applications. In plates of lead-acid batteries, for example, a substrate may have at least a coating of lead to provide for a conductive connection. Increasing the thickness of the lead, by applying another layer of lead onto the substrate, is desirable to increase the corrosion reserve of the plate and the useful life of the battery.

In various applications, a conductive material is typically applied to a substrate by plating. Plating, however, is an expensive and lengthy process that results in a thin layer of conductive material, which may not have a consistent thickness across the plated area. Further, control of the plated and non-plated areas requires masking or other time-consuming steps and does not allow for the precise application of thick layers of conductive material.

SUMMARY

A process of applying a conductive material to a substrate includes positioning a plurality of first conductive sheets between the substrate and a second conductive sheet. The first conductive sheets are heated to melt the first conductive sheets. The first conductive sheets have a lower melting point than the substrate and the second conductive sheet; the substrate and the second conductive sheet remain in a solid state when the first conductive sheets melt. A force is applied on the second conductive sheet toward the substrate, and the first conductive sheets are cooled to an attached state in which the first conductive sheets mechanically connect the second conductive sheet with the substrate.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
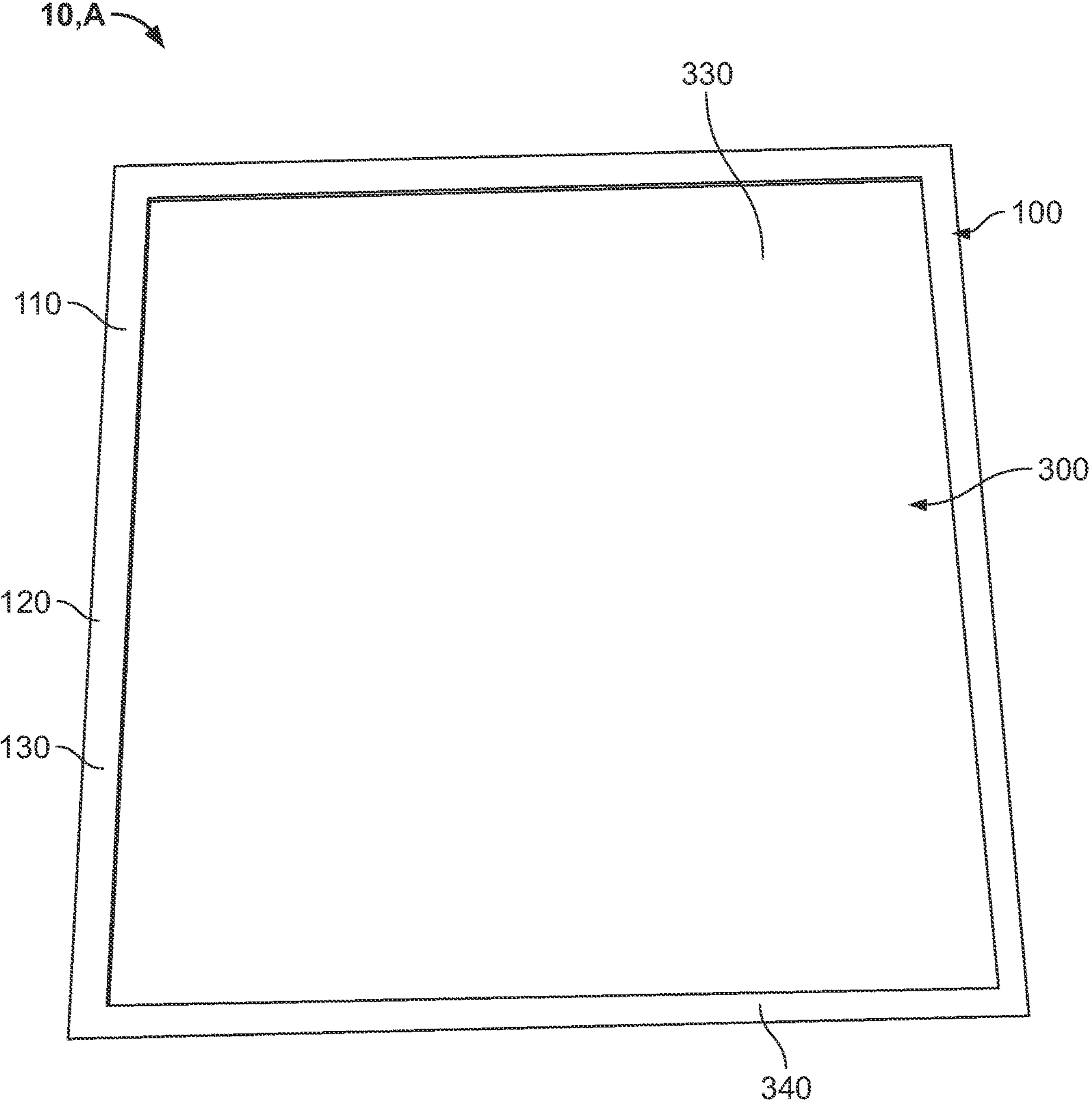
FIG. 1 is a plan view of a conductive sheet assembly according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Throughout the specification, directional descriptors are used such as "longitudinal", "width", and "vertical". These descriptors are merely for clarity of the description and for differentiation of the various directions. These directional descriptors do not imply or require any particular orientation of the disclosed elements.

Throughout the drawings, only some of a plurality of identical elements may be labeled in a figure for clarity of the drawings, but the detailed description of the element herein applies equally to each of the identically appearing elements in the figure.

Figure 2:
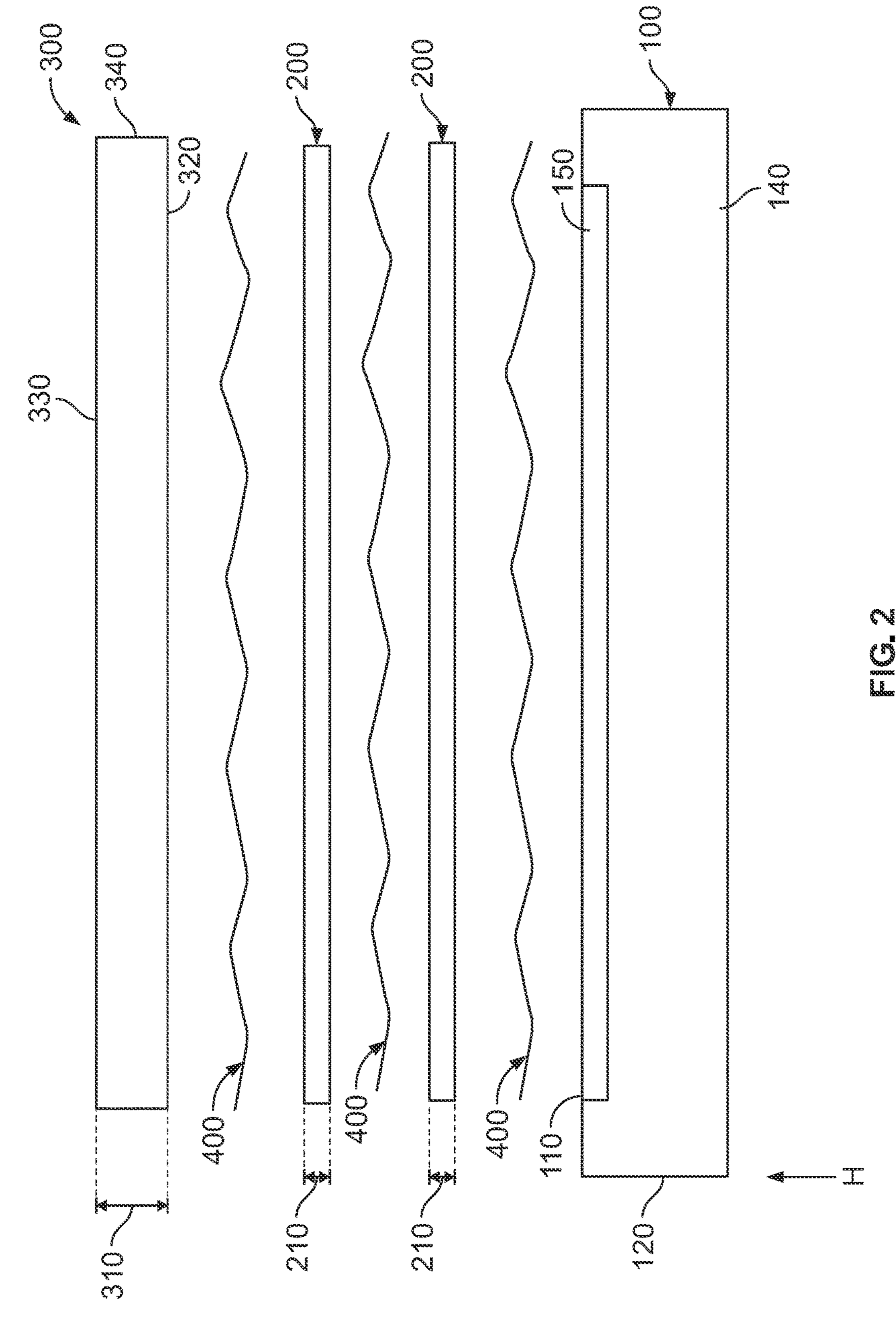
FIG. 2 is a schematic exploded side view of the conductive sheet assembly.

A conductive sheet assembly 10 according to an embodiment is shown in FIGS. 1 and 2. The conductive sheet assembly 10 includes a substrate 100, a pair of first conductive sheets 200 disposed on the substrate 100, and a second conductive sheet 300 disposed on a side of the first conductive sheets 200 opposite the substrate 100.

In the following description, the conductive sheet assembly 10 and the process 500 of applying a conductive material to the substrate 100 to form the conductive sheet assembly 10 will be described primarily with reference to an embodiment in which the conductive sheet assembly 10 is used as a plate of a bipolar, lead-acid battery. The inventive subject matter is not limited to this exemplary embodiment, however; the conductive sheet assembly 10 and the process 500 are also relevant to other applications in which a conductive sheet is applied to a substrate. The scope of the inventive subject matter is defined by the claims and their equivalents.

The substrate 100, as shown in FIGS. 1 and 2, has a substrate surface 110 on a side. The substrate 100 defines a substrate perimeter 120 extending around the substrate surface 110; the substrate perimeter 120 is an outer boundary of the substrate 100. In the shown embodiment, the substrate 100 has an approximately square shape. In other embodiments, the substrate 100 may have a rectangular shape, a curved shape, or any other shape that defines a substrate perimeter 120 with the substrate surface 110 on a side.

In the embodiment shown in FIG. 2, the substrate 100 has a base material 140 and a surface material 150 different from the base material 140 disposed on or in the base material 140. The surface material 150 forms at least a portion of the substrate surface 110. In an embodiment, the base material 140 is a doped silicon material and the surface material 150 is a nickel fused into the base material 140 to form a nickel silicide material at the substrate surface 110. In another embodiment, the base material 140 may be a conductive or a non-conductive material and the surface material 150 is a lead material electrically deposited, for example by electroplating, on the base material 140.

In other embodiments, the substrate 100 is formed of only the base material 140 without the surface material 150. In these embodiments, the base material 140 forms the substrate surface 110. In these embodiments, the base material 140 forming the substrate 100 may be a conductive material, such as a lead alloy resistant to corrosion, or may be a non-conductive material, such as a plastic.

In the embodiment shown in FIG. 2, the conductive sheet assembly 10 has two first conductive sheets 200 between the substrate 100 and the second conductive sheet 300. The first conductive sheets 200 are each formed of an electrically conductive, low melting point material, such as a solder. The conductive sheets 200, in an initial state of the conductive sheet assembly 10 described in greater detail below, are each a solid sheet of the electrically conductive, low melting point material. In an embodiment, the conductive sheets 200 are each a solid sheet or foil of 63/37 tin lead solder. In other embodiments, the conductive sheets 200 may be solid sheets of other types of solder material or other electrically conductive, low melting point materials.

As shown in FIG. 2, each of the first conductive sheets 200 has a first thickness 210 in a height direction H. In an embodiment, the first thickness 210 of each of the first conductive sheets 200 is approximately 0.002".

In other embodiments, the conductive sheet assembly 10 may only have one first conductive sheet 200 between the substrate 100 and the second conductive sheet 300. In these embodiments, the first thickness 210 of the first conductive sheet 200 may be greater than or equal to approximately 0.002" and less than or equal to approximately 0.004". In other embodiments, the conductive sheet assembly 10 may have more than two first conductive sheets 200, provided that a sum of the first thicknesses 210 of the first conductive sheets 200 is greater than or equal to approximately 0.002" and less than or equal to approximately 0.004".

The second conductive sheet 300, shown in FIGS. 1 and 2, has a second thickness 310 between an inner surface 320 and an outer surface 330 opposite the inner surface 320 in the height direction H. The second thickness 310 is greater than the first thickness 210. In embodiments in which a plurality of first conductive sheets 200 are disposed between the substrate 100 and the second conductive sheet 300, the second thickness 310 is greater than a sum of the first thicknesses 210 of the first conductive sheets 200. In an embodiment, the second thickness 310 is approximately 0.006".

The second conductive sheet 300 has a second sheet perimeter 340 extending around the inner surface 320 and the outer surface 330. The second sheet perimeter 340 is an outer boundary of the second conductive sheet 300. In the shown embodiment, the second conductive sheet 300 has an approximately square shape. In other embodiments, the second conductive sheet 300 may have a rectangular shape, a curved shape, or any other shape, provided that the second sheet perimeter 340 has a same shape as the substrate perimeter 120. The second sheet perimeter 340 is smaller than the substrate perimeter 120 in at least one dimension.

The second conductive sheet 300 is formed of a material different from the first conductive sheets 200 that has a higher melting point than the material of the first conductive sheets 200. The second conductive sheet 300, in an embodiment, is formed of lead or a lead alloy, and may be formed as a lead foil.

In the embodiment shown in FIG. 2, the conductive sheet assembly 10 has a flux 400 disposed between layers of the assembly 10 that, as described in greater detail below, is used in the process 500 of applying the second conductive sheet 300 to the substrate 100. In the shown embodiment, the flux 400 is positioned between the substrate 100 and the first conductive sheets 200, between the first conductive sheets 200, and between the first conductive sheets 200 and the second conductive sheet 300. The flux 400 may be any material that aids in the formation of solder bonds and, in an embodiment, is a liquid soldering flux.

The process 500 of forming the conductive sheet assembly 10 by applying the second conductive sheet 300 to the substrate 100 will now be described primarily with respect to FIG. 3.

Figure 3:
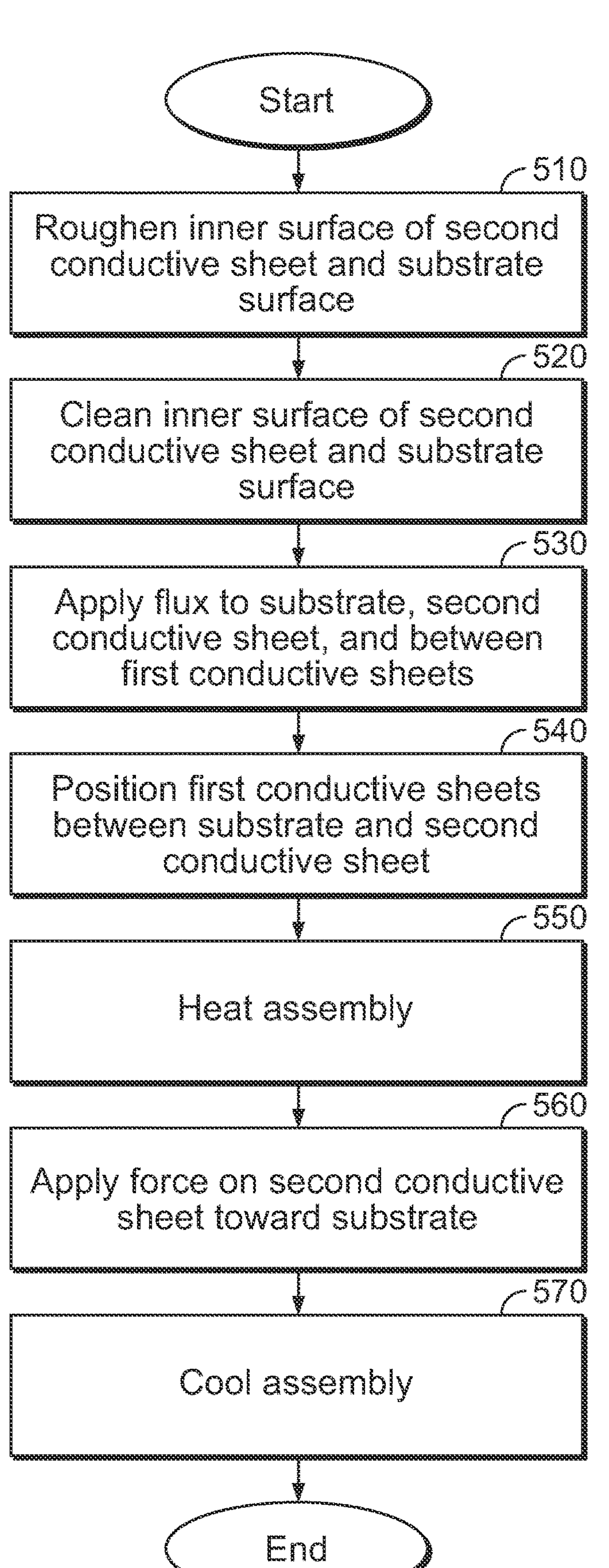
FIG. 3 is a flowchart of a process of forming the conductive sheet assembly.

In a first step 510 shown in FIG. 3, the substrate surface 110 of the substrate 100 and the inner surface 320 of the second conductive sheet 300 are roughened. In an embodiment, the substrate surface 110 and the inner surface 320 are roughened manually by an operator using, for example, sandpaper, an abrasive pad, or any other abrasive substance. In other embodiments, only one of the substrate surface 110 and the inner surface 310 may be roughened, or the roughening step 510 may be omitted.

In a second step 520, the substrate surface 110 and the inner surface 320 are cleaned. In an embodiment, the substrate surface 110 and the inner surface 320 are cleaned manually by an operator using, for example, an alcohol solution or another cleaning substance. The operator may wipe the surface 110, 320 with the alcohol solution and then rinse the surface 110, 320 with water. In other embodiments, only those surfaces of the substrate surface 110 and the inner surface 320 that have been roughened are cleaned, or the cleaning step 520 may be omitted.

As shown in FIG. 3, in a third step 530, the flux 300 is applied to the substrate surface 110, the inner surface 320, and between the first conductive sheets 200. In other embodiments, the flux 300 may only be applied to one of the substrate surface 110 and the inner surface 320, or the application of the flux 300 in step 530 may be omitted. The flux 300 is only applied between the first conductive sheets 200 when a plurality of first conductive sheets 200 are present.

In a step 540 shown in FIG. 3, the first conductive sheets 200 are positioned between the substrate 100 and the second conductive sheet 300, as shown in FIG. 2. The first conductive sheets 200 contact the substrate surface 110 and the inner surface 320 of the second conductive sheet 300. In an embodiment in which the conductive sheet assembly 10 has one first conductive sheet 200, the single first conductive sheet 200 is positioned in contact with the substrate surface 110 and the inner surface 320.

With the first conductive sheets 200 positioned between the substrate 100 and the second conductive sheet 300, the conductive sheet assembly 10 is heated in a step 550 shown in FIG. 3. The assembly 10 is heated above the melting point of the first conductive sheets 200 and below the melting point of the substrate 100 and the second conductive sheet 300. In various embodiments, the first conductive sheets 200 are heated to a temperature greater than 300° F. and less than or equal to 400° F. The heat in the heating step 550 may be applied by a heated platen press or any other heating element capable of heating at least the first conductive sheets 200. In the heating step 550, the first conductive sheets 200 are in a melted state and the substrate 100 and the second conductive sheet 300 remain in a solid state.

In a step 560, with the first conductive sheets 200 in a melted state, a force is applied on the second conductive sheet 300 in a direction toward the substrate 100. The force is greater than or equal to 20 psi and less than or equal to 60 psi. The force may be applied by pressing or rolling. In an embodiment in which the plated press is heated to apply the heat in the heating step 550, the platen press can also be used to apply the force in the force application step 560.

Following or during the application of the force in step 560, the assembly 10 is cooled in step 570 to solidify the first conductive sheets 200 to an attached state A of the assembly 10. shown in FIG. 1, in which the first conductive sheets 200 mechanically connect the second conductive sheet 300 to the substrate 100.

In an embodiment, the application of the heat in the heating step 550 and the application of the force in the force application step 560 occur simultaneously. The application of the force in the force application step 560 may continue beyond the end of the heating, such that the force is also applied after the heating step 550 and during at least a portion of the cooling step 570. In an embodiment, the heat is applied in the heating step 550 for less than approximately 10seconds to melt the first conductive sheets 200 while the force is applied, and the application of the force is continued at least during the first two minutes of a cooling step 570 that lasts, for example, for five minutes. In another embodiment, the application of the force in the force application step 560 can continue beyond the end of the heating and through an entirety of the cooling step 570.

The completed process 500 forms the conductive sheet assembly 10 as shown in FIG. 1. As shown in the embodiment of FIG. 1, because the second sheet perimeter 340 is smaller than the substrate perimeter 120, the second conductive sheet 300 only covers a portion of the substrate surface 110 in the attached state A. The substrate perimeter 120 extends beyond the second sheet perimeter 340 on at least one side to form an uncovered section 130 of the substrate surface 110 on which the second conductive sheet 300 is not disposed.

The shape of the second conductive sheet 300 and the substrate 100, including the size and arrangement of the uncovered section 130, are merely exemplary in the embodiment of FIG. 1. The second conductive sheet 300 can be applied according to the process 500 to form the conductive sheet assembly 10 in nearly any size and shape with respect to the substrate 100, permitting precise control over the application of the second conductive sheet 300 and the position of the uncovered section 130.

In an application in which the conductive sheet assembly 10 is used as a plate of a bipolar, lead-acid battery, the second conductive sheet 300 is a lead foil applied to the substrate 100 to increase a corrosion reserve and extend the life of the battery. In an embodiment of the battery application, the surface material 150 is lead and the lead foil of the second conductive sheet 300 is attached to the substrate surface 110 on the negative side of the plate to increase the thickness of lead.

The conductive sheet assembly 10 and process 500, across various different applications in addition to the aforementioned battery application, permit the cost-effective and efficient attachment of a thick, uniform layer of conductive material formed as the second conductive sheet 300 to the substrate 100. The shape of the second conductive sheet 300 and the substrate 100, including the size and arrangement of the uncovered section 160, can be precisely controlled in the conductive sheet assembly 10 following the process 500 for other shapes and arrangements, permitting greater control of the application of a thick, consistent layer of conductive material than, for example, by plating.

What is claimed is:

1. A conductive sheet assembly, comprising:

a substrate;

a plurality of first conductive sheets disposed on the substrate, the first conductive sheets are each formed of a solder material; and a second conductive sheet disposed on the first conductive sheets, the second conductive sheet is a lead foil, the first conductive sheets each have a lower melting point than the second conductive sheet and mechanically connect the second conductive sheet to the substrate.

2. The conductive sheet assembly of claim 1, wherein each of the first conductive sheets has a first thickness that is less than a second thickness of the second conductive sheet.

3. The conductive sheet assembly of claim 2, wherein the second thickness of the second conductive sheet is approximately 0.006".

4. The conductive sheet assembly of claim 2, wherein a sum of the first thicknesses of the first conductive sheets is less than the second thickness of the second conductive sheet.

5. The conductive sheet assembly of claim 1, wherein the substrate has a base material and a surface material different from the base material, the surface material forms at least a portion of a substrate surface of the substrate facing the second conductive sheet.

6. The conductive sheet assembly of claim 1, wherein the substrate has a substrate perimeter and the second conductive sheet has a second sheet perimeter, the substrate perimeter extends beyond the second sheet perimeter on at least one side to form an uncovered section of the substrate.

7. The conductive sheet assembly of claim 1, further comprising a flux positioned between the first conductive sheets.

8. The conductive sheet assembly of claim 1, wherein the plurality of first conductive sheets are each disposed on one side of the substrate.

9. The conductive sheet assembly of claim 1, wherein the substrate has a surface material forming at least a portion of a substrate surface of the substrate facing the second conductive sheet, the plurality of first conductive sheets are each disposed on the substrate surface.

10. The conductive sheet assembly of claim 1, wherein the substrate has a substrate surface on one side of the substrate, the plurality of first conductive sheets are each disposed on the substrate surface.

11. The conductive sheet assembly of claim 1, wherein each first conductive sheet is only formed of the solder material.

12. The conductive sheet assembly of claim 1, wherein the conductive sheet assembly only has one second conductive sheet.

* * * * *